Dec. 22, 1953   M. DIAMOND   2,663,361
DEVICE FOR ANCHORING SPRINGS
Filed Oct. 13, 1952
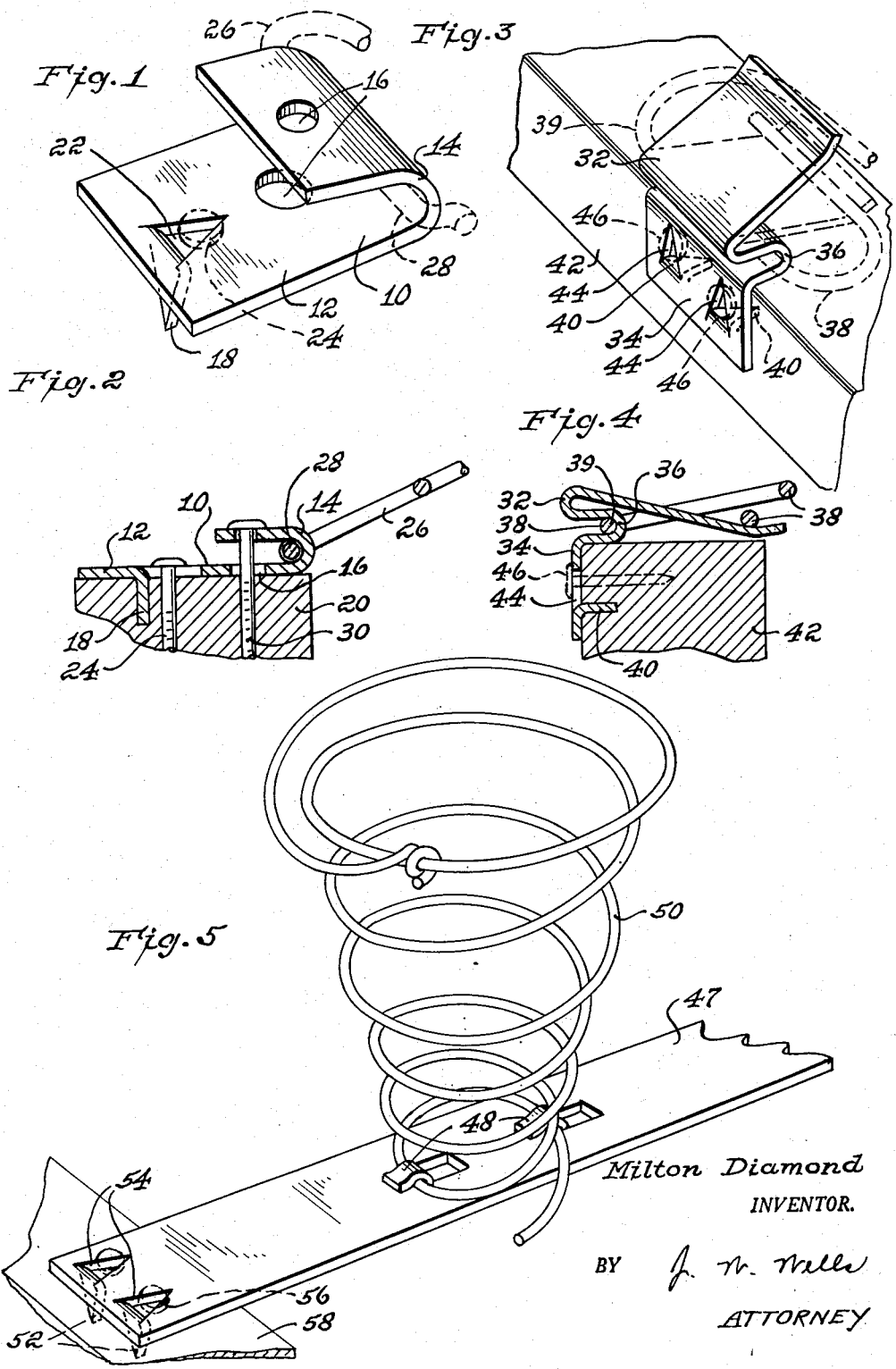
Milton Diamond
INVENTOR.
BY  *J. M. Miller*
ATTORNEY Patented Dec. 22, 1953

2,663,361

UNITED STATES PATENT OFFICE 2,663,361

DEVICE FOR ANCHORING SPRINGS

Milton Diamond, Trenton, N. J.

Application October 13, 1952, Serial No. 314,430

1 Claim. (Cl. 155—179)

This invention relates to fastening devices, and more particularly to devices for anchoring springs of various forms to the frame structures employed in the fabrication of upholstered chairs and other furniture, in such a manner as to afford freedom of function of the springs in the finished articles of furniture. Such devices include clips for engaging and holding one end of a single spring and also longer metal strips to which a number of springs may be connected.

Heretofore, clips and metal strips for anchoring springs to furniture frames have been provided with nail holes through which nails were inserted into a frame, as the initial and only means of anchoring the springs to a frame. A serious disadvantage of such devices is that the workmen engaged in attaching them to furniture frames are compelled to carry not only a supply of clips or other anchoring members but also a supply of nails, in addition to a hammer for driving the nails into the wooden frames. With one hand encumbered with a number of anchoring members and the other with a quantity of nails the procedure of the workmen in attaching the devices is greatly retarded because of the difficulty of placing the anchoring members and nails and wielding a hammer in driving the nails into the frames.

Therefore, one of the principal objects of the present invention is to provide a clip or other metal spring anchoring member of the type mentioned having not only an opening for a nail or other suitable fastening element but additionally a rigid projection or prong which can be driven by a hammer into a wooden frame as the initial means of attaching the clip or other member, without the use of any separate fastening means, the anchoring member subsequently being permanently fastened to the frame by means of a nail, screw or the like inserted through the opening into the frame.

Another object of this invention is to provide a clip or other metal spring anchoring member having an opening therein and also a projection or prong for the purpose mentioned, both of which can be formed in a single manufacturing operation at substantially the same cost as that of punching the nail holes in previous devices.

I have found that a practical and economical method of forming both an opening and a perpendicular prong in a flat metal spring anchoring clip or strip is to stamp or punch such prong from the flat base of the clip or similar anchoring member, thereby providing not only an integral element in the clip or other member which can be imbedded in a wooden frame, as the initial means of attaching the member to the frame, but also providing a suitable opening in the base of the clip or other member, formed by the stamping or punching operation, through which a nail or the like may be inserted into the frame, as a permanent fastening means. The cost of the single operation in providing both the opening and the prong does not exceed that of the previous operation of punching the nail hole, only.

I am aware that it is not new to stamp projections from a sheet of metal as a means of attaching it to a wooden support, but I am the first, so far as I know and believe, to provide in a flat spring anchoring member both a perpendicular prong as the initial attaching means and an opening to accommodate a nail or the like as the permanent attaching or fastening means.

Although my features of improvement in spring anchoring devices are exceedingly simple in both their construction and application, they mark a distinct advance in the art, since at no additional cost of manufacture they greatly facilitate the work of installing springs in the fabrication of upholstered furniture.

Another important feature of advantage in my invention resides in the increased rigidity of the attachment of the anchoring member to the furniture frame resulting from the combined support provided by the prong and the additional fastening element inserted through the opening into the frame.

Other objects and advantages of my invention will be apparent from the following specification and reference to the accompanying drawings, in which Fig. 1 is an enlarged perspective view of one form of spring anchoring clip with my invention applied thereto;

Fig. 2 is a sectional view of the clip shown in Fig. 1 as attached to a wooden frame with a spring anchored therein;

Fig. 3 is a perspective view of another form of spring anchoring clip with my invention applied thereto;

Fig. 4 is a sectional view of the clip shown in Fig. 3 as attached to a furniture frame with a spring anchored therein; and Fig. 5 is a perspective view of another form of spring supporting member with my invention applied thereto.

In the drawings the clips, or spring supporting members illustrated are typical of those previously provided with only a nail hole for the insertion of a nail into a frame as the initial and only means of attachment to a frame. It should be understood that those illustrated are only a few of the various clips and devices carrying means for engaging and holding the end of a spring and having a flat base portion to which my invention can be applied.

The clip 10 illustrated in Figs. 1 and 2 has a flat base 12 which extends outwardly from a U-shaped bend 14 through the opposed walls of which are registering openings 16. Adjacent the outer end of the base portion 12 is a depending prong 18 which is arranged to be driven into a frame by a hammer, or the like. The clip 10 may be made out of sheet steel or other suitable metal and the prong 18 stamped or punched from the base of the clip, thereby forming an opening 22 adjacent the prong or projection. This opening permits the insertion therethrough of suitable retaining means, such as a nail, screw or the like 24 into the frame 20, when it is desired to effect permanent fastening of the clip to the frame 20. With this form of clip an elongated spring 26, having a transversely extending end portion 28, is inserted in the open end of the U-shaped bend or hook 14, after which a nail, or the like 30 is driven through the openings 16 into the frame 20, thereby slightly flattening the overlapping portion of the clip, as shown in Fig. 2.

The clip 32, illustrated in Figs. 3 and 4 also has a flat base portion 34 extending outwardly and downwardly from a U-shaped bend 36 for engagement with one end of an elongated wire spring 38, having a transversely extending portion 39, as shown more clearly in dotted lines in Fig. 3. A pair of integral, perpendicular prongs 40 may be struck inwardly from the base 34, these prongs being arranged to be driven by a hammer, or the like, into a wooden frame 42. The stamping operation leaves an opening 44 adjacent each prong 40 through which nails, or the like (shown dotted) may be driven into the frame 42.

The spring supporting member 47 illustrated in Fig. 5 consists of a flat metal strip having fingers 48 bent over the lower coils of a number of helical springs 50. Adjacent each end of the strip 47 is a pair of perpendicularly arranged prongs 52 struck from the flat metal and leaving openings 54 through which nails, screws or other suitable fastening elements 56 (shown dotted) may be inserted into a frame 58.

In the use of my improved spring anchoring members a workman will carry only a supply of clips, such as those illustrated in Figs. 1 to 4, or a supply of strips, such as the one illustrated in Fig. 5, and a hammer or other tool for forcing the prongs of the anchoring members into a frame made of wooden or other penetrable material, when initially attaching the members to the furniture frames. His entire working time may be confined to such initial installations. Since he has only to place a clip, or similar device provided with the prongs and openings, in position and drive the prong into a frame, the number of anchoring devices that he can install in a given time is greatly increased, as compared with the use of previous anchoring devices, because of the elimination of the need for carrying and using a supply of nails. Another workman may subsequently insert nails or the like through the openings in the devices to complete the permanent installation.

As previously mentioned, my invention is applicable to a number of forms of clips and other spring anchoring devices, in addition to the forms illustrated in the drawings. Therefore, it should be understood that my invention is not limited to the specific embodiments shown and described.

I claim:

A metal U-shaped clip of uniform width for attachment to a non-metallic frame, said clip including a base having at one end an upwardly bent portion overlapping said base and providing a space arranged to receive an end portion of an elongated spring, said base having a portion extending outwardly from said overlapped portion and provided with a struck out depending prong and forming an opening for receiving a retaining member, said prong being adapted to be initially embedded into said frame and said opening adapted to receive a retaining member for permanently securing the clip to said frame, said overlapped portion and said base having vertically aligned openings in the same vertical plane with said prong for receiving an auxiliary retaining member arranged to be embedded in the frame and which coacts with said prong and said first mentioned retaining member for firmly connecting the clip to said frame.

MILTON DIAMOND.

References Cited in the file of this patent

UNITED STATES PATENTS

| Number | Name | Date |
|---|---|---|
| 389,933 | Mansfield | Sept. 25, 1888 |
| 1,836,463 | Galla | Dec. 15, 1931 |
| 2,542,458 | Bank | Feb. 20, 1951 |
| 2,593,831 | Bank | Apr. 22, 1952 |

FOREIGN PATENTS

| Number | Country | Date |
|---|---|---|
| 321,211 | Great Britain | Nov. 4, 1929 |